United States Patent
Isaji

(10) Patent No.: US 7,190,305 B2
(45) Date of Patent: Mar. 13, 2007

(54) RADAR APPARATUS

(75) Inventor: Osamu Isaji, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 147 days.

(21) Appl. No.: 11/070,601

(22) Filed: Mar. 3, 2005

(65) Prior Publication Data

US 2005/0206556 A1 Sep. 22, 2005

(30) Foreign Application Priority Data

Mar. 22, 2004 (JP) .............................. 2004-082627

(51) Int. Cl.
*G01S 13/44* (2006.01)

(52) U.S. Cl. .................. 342/70; 342/107; 342/113; 342/133; 342/139; 342/146; 342/147; 342/149

(58) Field of Classification Search ............ 342/70–72, 342/80, 81, 107–115, 133, 139, 141, 146, 342/147, 149–158
See application file for complete search history.

(56) References Cited

U.S. PATENT DOCUMENTS

| | | | |
|---|---|---|---|
| 4,646,093 A | 2/1987 | Postema et al. ............. 342/151 |
| 5,315,304 A | 5/1994 | Ghaleb et al. ............... 342/165 |
| 5,600,326 A | 2/1997 | Yu et al. ........................ 342/17 |
| 5,633,642 A * | 5/1997 | Hoss et al. .................... 342/70 |
| 5,986,605 A | 11/1999 | Priebe et al. |
| 6,317,073 B1 | 11/2001 | Tamatsu et al. .............. 342/70 |
| 6,573,859 B2 * | 6/2003 | Tokoro ........................ 342/70 |
| 6,750,809 B1 * | 6/2004 | Cho et al. ................... 342/129 |
| 6,859,168 B2 * | 2/2005 | Isaji ........................... 342/128 |
| 6,924,762 B2 * | 8/2005 | Miyake et al. ................ 342/70 |
| 6,956,521 B2 * | 10/2005 | Kai ............................. 342/70 |
| 2001/0015698 A1 * | 8/2001 | Tokoro ........................ 342/70 |
| 2002/0180632 A1 | 12/2002 | Isaji ............................ 342/70 |
| 2005/0206556 A1 * | 9/2005 | Isaji ........................... 342/149 |
| 2006/0238405 A1 * | 10/2006 | Wakayama et al. ........... 342/79 |
| 2006/0250299 A1 * | 11/2006 | Falk ............................ 342/90 |

FOREIGN PATENT DOCUMENTS

EP 0 898 174 A1 2/1999
EP 0 965 859 A1 12/1999

(Continued)

OTHER PUBLICATIONS

"Comparison of monostatic and bistatic bearing estimation performance for low RCS targets", Boyle, R.J.; Wasylkiwskyj, W. Aerospace and Electronic Systems, IEEE Trans on vol. 30, Issue 3, Jul. 1994 Ps:962-968.*

(Continued)

*Primary Examiner*—John B. Sotomayor
(74) *Attorney, Agent, or Firm*—Oliff & Berridge, PLC

(57) ABSTRACT

In a radar apparatus, a receiving antenna includes a plurality of antenna elements, each receiving, as a reception signal, radio waves emitted into space and reflected off a target object. An analog signal is obtained by downconverting and putting a bandwidth constraint on the reception signal, and is then converted to a digital signal. Based on the digital signal, a signal processing unit detects the bearing of the target object. The signal processing unit performs processing based on outputs of two sets of the antenna elements.

19 Claims, 10 Drawing Sheets

FOREIGN PATENT DOCUMENTS

| | | |
|---|---|---|
| EP | 1 348 978 A1 | 10/2003 |
| JP | A 9-162626 | 6/1997 |
| JP | A 11-64485 | 3/1999 |
| JP | A 11-125672 | 5/1999 |
| JP | A 11-160423 | 6/1999 |
| JP | A 11-281729 | 10/1999 |
| JP | A 11-287854 | 10/1999 |
| JP | A 2000-31736 | 1/2000 |
| JP | A 2000-221260 | 8/2000 |
| JP | A 2000-230947 | 8/2000 |
| JP | A 2000-284044 | 10/2000 |
| JP | A 2000-284047 | 10/2000 |
| JP | A 2001-51050 | 2/2001 |
| JP | 2001/228239 | 8/2001 |
| JP | A 2001-264427 | 9/2001 |
| JP | A 2002-511922 | 4/2002 |
| JP | A 2003-14843 | 1/2003 |
| JP | A 2003-232852 | 8/2003 |

OTHER PUBLICATIONS

"Maximum likelihood angle extractor for two closely spaced targets", Sinha, A.; Kirubarajan, T.; Bar-Shalom, Y. Aerospace and Electronic Systems, IEEE Transactions on vol. 38, Issue 1, Jan. 2002 Ps:183-203.*

"Monopulse radar based on spatiotemporal correlation of stochastic signals", Yan Zhang; Narayanan, R.M. Aerospace and Electronic Systems, IEEE Transactions on vol. 42, Issue 1, Jan. 2006 Ps:160-173.*

R.L. Howard et al.; "A Hybrid Partitioning Architecture for ADBF in Monopulse Arrays"; Radar 97, Oct. 14-16, 1997, Publication No. 449 IEE 1997; pp. 65-69.

* cited by examiner

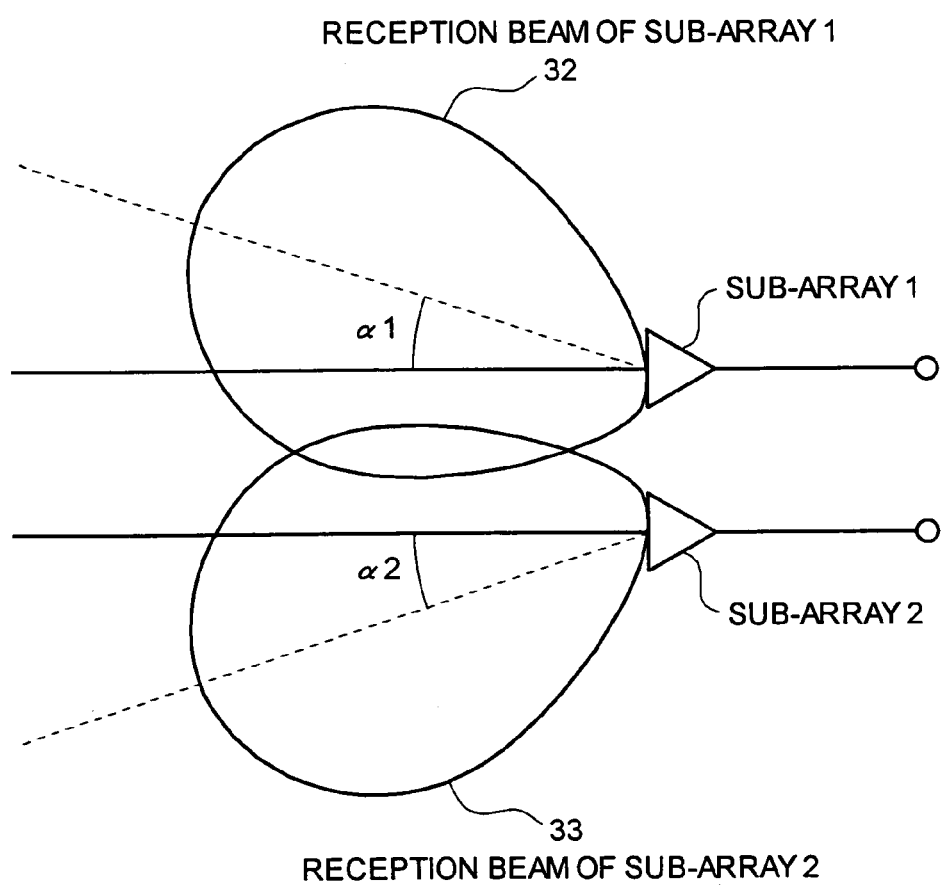

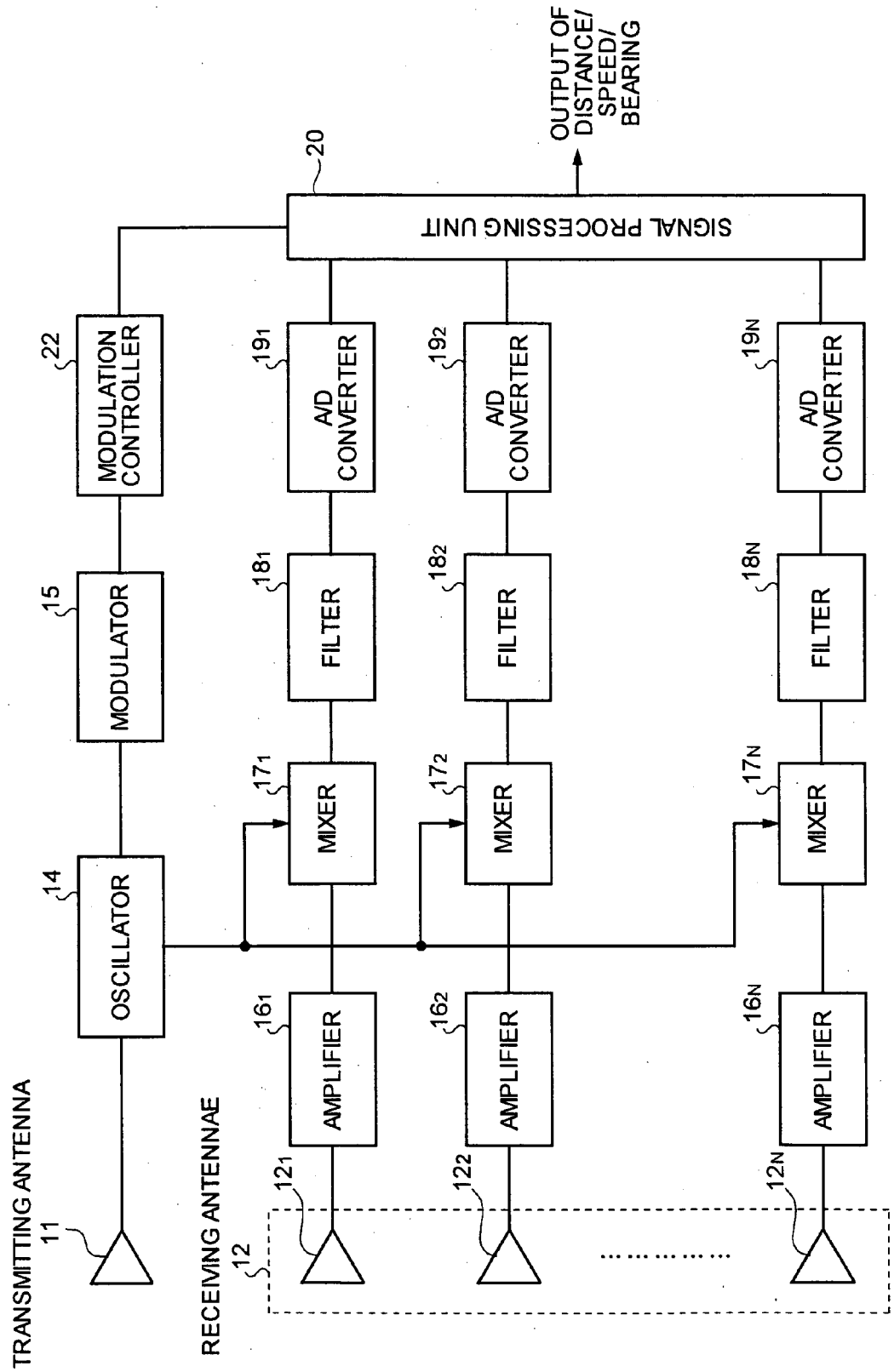

FIG.11A NORMAL MODULATING SIGNAL
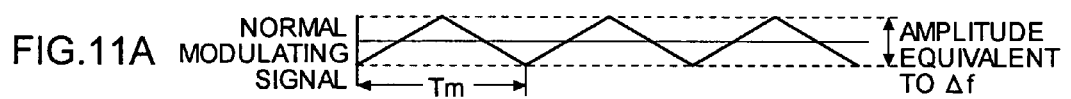
Tm
AMPLITUDE EQUIVALENT TO Δf
FIG.11B CONTROLLED MODULATING SIGNAL
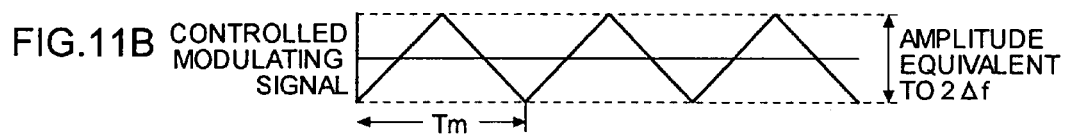
Tm
AMPLITUDE EQUIVALENT TO 2Δf
FIG.11C CONTROLLED MODULATION SIGNAL
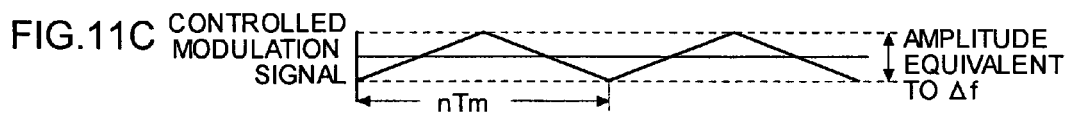
nTm
AMPLITUDE EQUIVALENT TO Δf

RADAR APPARATUS

BACKGROUND OF THE INVENTION

1. Field of the Invention

The present invention relates to a Digital Beam Forming (DBF) radar apparatus having a receiving antenna that includes a plurality of antenna elements, and that forms antenna beams digitally.

2. Description of the Related Art

In recent years, DBF type radar apparatuses provided with array antennae that include a plurality of antenna elements, and that form antenna beams digitally with the aid of a signal processing unit, have come into focus.

Each of the antenna elements in the array antenna is connected to a radio frequency (RF) amplifier, a mixer, a filter, and an A/D converter. A digital beam forming processor takes in digital signals that are output by each A/D converter, and carries out a digital beam forming process.

Japanese Patent Laid-Open Publication Nos. H11-160423 H11-064485 disclose DBF type radar apparatuses in which the number of expensive high-frequency analog devices that are attached to each antenna element are limited, as well as maintaining compactness and simplicity of the apparatus.

Japanese Patent Laid-Open-Publication No. H09-162626 discloses a monopulse radar apparatus having a flat, two-circuit array antenna including rows of antenna elements. Odd and even numbered rows of the antenna elements are arranged in an arch-shape to form teeth of a comb. With such structure, thereby enhancing antenna gain. Moreover, by maintaining a gap of less than $\lambda$ between the phase centers of the array antenna, the increase in ambiguity due to phase aliasing at the time of phase difference detection is prevented in the monopulse radar apparatus, regardless of the increase in the number of antenna elements.

Many examples of radar apparatuses that use a phase comparison monopulse system are disclosed among conventional analog process type radar apparatuses. For example, Japanese Patent Laid-Open Publication No. H11-281729 discloses a radar apparatus that perform target search over a wide range, and an identification of multiple targets. Such radar apparatuses make use of amplitude change of reception signals generated from switching of a transmission beam, using a plurality of transmitting antennae.

The radar apparatuses disclosed in Japanese Patent Laid-Open Publication Nos. H11-160423 H11-064485 are obtained by eliminating some of the parts of the conventional DBF type radar apparatus, with a view to reducing production cost as well as making the product compact and simple. However, the advantages of the conventional DBF type radar apparatus cannot be guaranteed in these radar apparatuses.

Moreover, in these radar apparatuses, the objective was to limit the number of high frequency analog devices, and hence, the antenna system was not given much consideration. However, in many cases, the number of antenna elements, rather than the number of high frequency analog devices, presents problems such as constraints in mounting. For example, the number of antenna elements needs to be reduced when there are space constraints on the mounting platform.

In the radar apparatus disclosed in Japanese Patent Laid-Open Publication No. H09-162626, the antenna elements in the array antennae need to be coupled with one another (in a comb tooth like fashion) in each array antenna. Considering the size of the antenna element itself (usually about $\lambda/2$), and the need to avoid the influence of coupling between the antenna elements, it is difficult to narrow the spacing (for example, make it less than $\lambda$) between the antenna elements of the array antenna. Consequently, in the array antennae provided on such a radar apparatus, although the spacing between the phase centers of the two array antennae can be set below $\lambda$, the spacing between the antenna elements of the array antenna itself may be more than $\lambda$. Thus, it is impossible to effectively curb the range of ambiguity in the target direction due to the antenna pattern of the array antenna itself.

Further, in the radar apparatus disclosed in Japanese Patent Laid-Open Publication No. H09-162626, one antenna element is associated with either of the array antennae, and the concept of DBF process, in which the output of the antenna elements is repeatedly used between different array antennae, is absent. Thus, it is difficult to assemble and arrange the antenna elements of the array antennae, and the number of antenna elements has to be reduced when there are space constraints on the mounting platform.

Moreover, the degree of freedom required in controlling the beam width and the beam bearing of each array antenna is almost absent in the radar apparatus disclosed in Japanese Patent Laid-Open Publication No. H09-162626. Thus, it is difficult to carry out monopulse processes involving a high degree of freedom, such as limiting the search area or substantially simultaneously searching multiple search areas.

The radar apparatus disclosed in Japanese Patent Laid-Open Publication No. H11-281729 carries out the phase comparison monopulse process by switching transmission beams using a plurality of transmitting antennae. Because considerable space is required for mounting the transmitting antennae, it is impossible to implement the system when there are space constraints on the platform used for mounting the transmitting antennae.

SUMMARY OF THE INVENTION

It is an object of the present invention to at least solve the problems in the conventional technology.

According to an aspect of the present invention, a radar apparatus includes a transmitting unit that emits a transmitter pulse, in the form of a radio wave, into space; a receiving antenna including a plurality of antenna elements each of which receives, as a reception signal, the radio wave that reaches a target object and is reflected off the target object; a receiving unit that receives the reception signal, down-converts the reception signal and puts a bandwidth constraint on the reception signal to obtain an analog signal, converts the analog signal into a digital signal, and outputs the digital signal; and a signal processing unit that detects a bearing of the target object based on the digital signal, wherein a first transaction includes processing of signals output from a first set of the antenna elements, a second transaction involving processing of the signals output from a second set of the antenna elements, and the signal processing unit executes a specified process based on an output of the first transaction and an output of the second transaction.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 7 illustrates a concept of an amplitude comparison monopulse process applied in a DBF radar apparatus, according to a second embodiment;

FIG. 8 is a block diagram of the radar apparatus according to a third embodiment;

FIG. 11A, FIG. 11B, and FIG. 11C are drawings to explain how a modulating signal output from a modulator to an oscillator is controlled.

DETAILED DESCRIPTION

Exemplary embodiments of the present invention are explained in detail below, with reference to the accompanying drawings. However, the present invention is not limited to the embodiments described herein.

Figure 1:
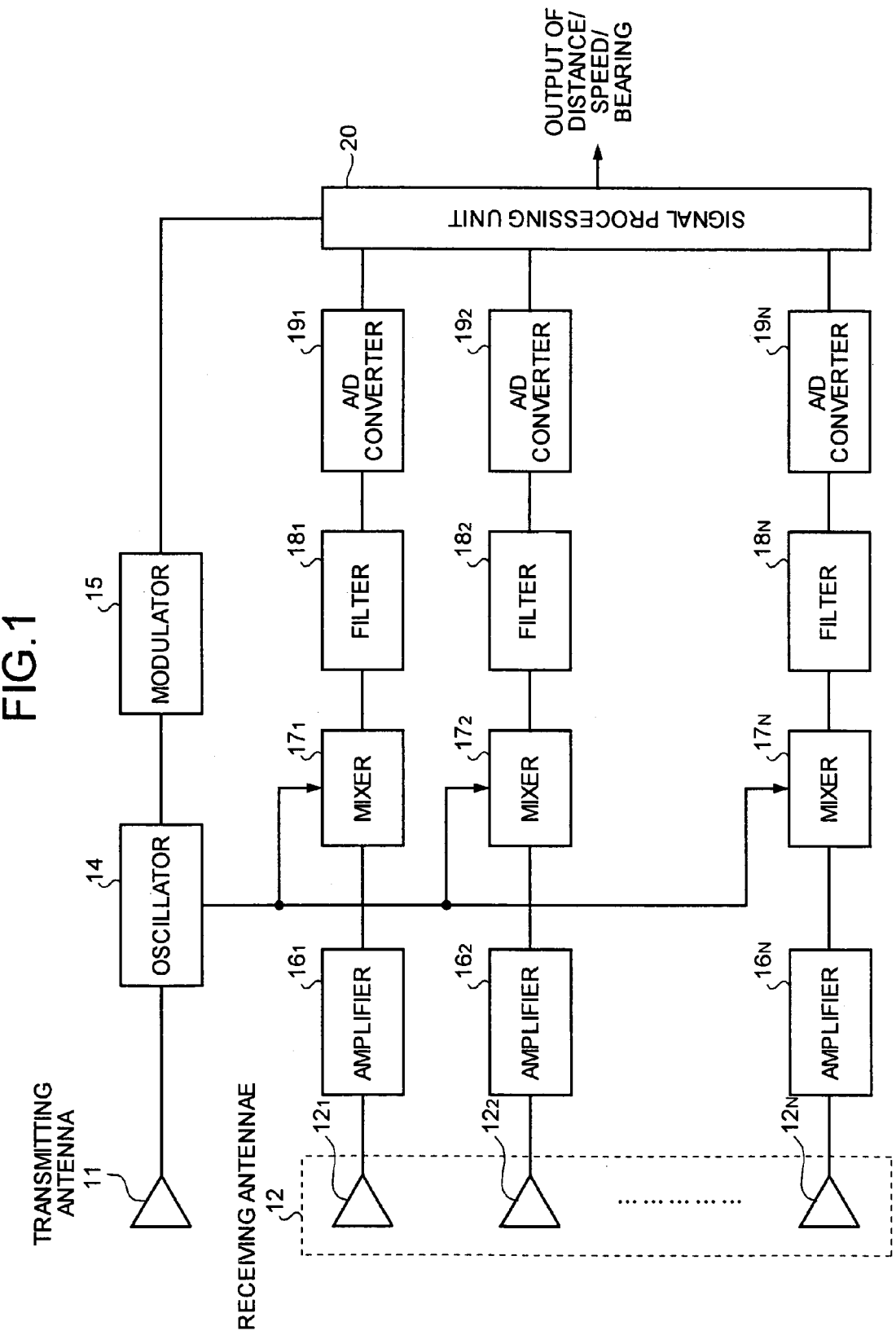
FIG. 1 is a block diagram of a radar apparatus according to a first embodiment of the present invention.

FIG. 1 is a block diagram of a radar apparatus according to a first embodiment of the present invention. A transmitting system of the radar apparatus in FIG. 1 includes a transmitting antenna 11, an oscillator 14, and a modulator 15. A receiving system includes a plurality of receiving antennae 12 ($12_1$, $12_2$, ... $12_N$), amplifiers 16 ($16_1$, $16_2$, ... $16_N$), mixers 17 ($17_1$, $17_2$ ... $17_N$), filters 18 ($18_1$, $18_2$, ... $18_N$), A/D converters 19 ($19_1$, $19_2$, ... $19_N$), and a signal processing unit 20. The amplifiers 16 are connected to corresponding receiving antennae 12. The mixers 17 downconvert each of the signals (reception signals) output from the amplifiers 16, based on the signals (local signals) fed from the oscillator 14. The filters 18, connected to the mixers 17, put a bandwidth constraint on the downconverted signals. The A/D converters 19, connected to the filters 18, convert the reception signals from analog signals to digital signals, after the reception signals are subjected to bandwidth constraint. The signal processing unit 20 executes signal processing based on the digital signals output from the A/D converters 19. A phase comparison monopulse process carried out by the signal processing unit 20, which is a salient feature of the present invention, is explained in detail later.

The concept of digital beam forming (DBF) technology, which is applied to the present invention, is explained next. Explained simply, the DBF technology includes converting from analog to digital, the reception signals received by array antennae consisting of a plurality antenna elements, feeding these signals into a signal processing unit, and digitally controlling the antenna characteristics, such as beam forming, beam scanning, and side lobe suppression. A phased array antenna radar is explained first, because understanding the principle of the conventional phased array antenna radar helps understand DBF technology better.

Figure 6:
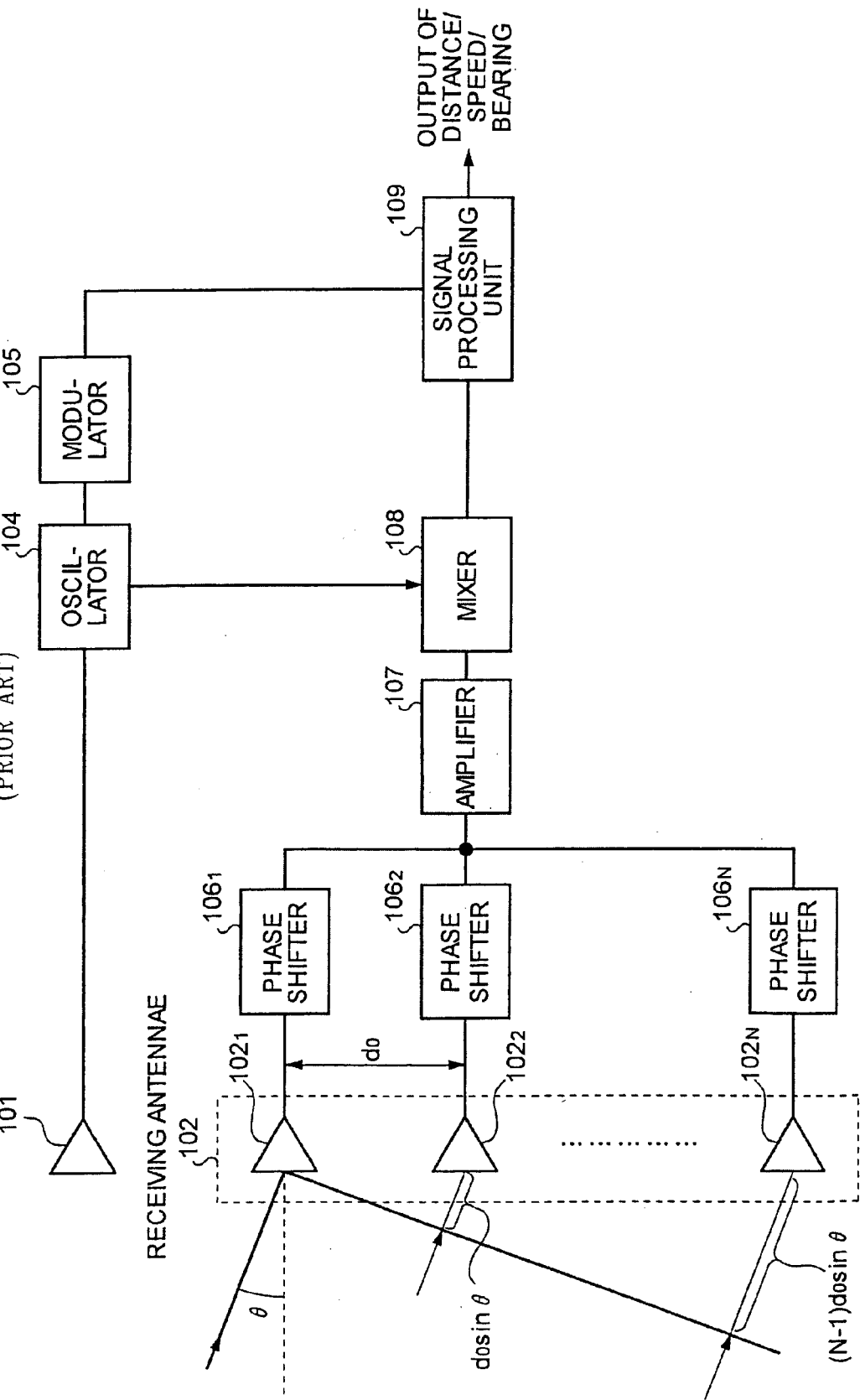
FIG. 6 illustrates a basic configuration of a conventional phased array antenna radar.

FIG. 6 illustrates a basic configuration of a conventional phased array antenna radar. N number of receiving antennae 102 ($102_1$ through $102_N$) at a spacing of $d_0$ between them receive a radio wave entering from a direction that makes an arrival angle θ with the normal (shown as dashed line in FIG. 6) direction of the receiving antenna array of this radar. In this case, if the propagation path length of the radio wave for the receiving antenna $102_1$ is taken as the standard, the propagation path lengths of the radio waves for receiving antennae $102_2$, $102_3$, ... $102_N$ will increase as much as $d_0$ sin θ, $2d_0$ sin θ, ... (N−1)$d_0$ sin θ, respectively. Therefore, the phases of the radio waves arriving at the receiving antennae $102_2$ through $102_N$ will be delayed by each of those propagation path lengths, respectively, relative to the phase of the radio wave arriving at the receiving antenna $102_1$.

If the wavelength of a radio wave is taken as λ, the phase difference (phase delay) will be $(2\pi/\lambda)d_0$ sin θ, $(2\pi/\lambda)2d_0$ sin θ, ... $(2\pi/\lambda)(N-1)d_0$ sin θ. By using phase shifters $106_1$, $106_2$, ... $106_N$ set up in the latter part of each receiving antenna, if the phases are made to advance in the direction opposite to that of the phase difference, the radio wave that having an arrival angle θ combines with each of the radio waves of the receiving antennae 102 without any phase delay, and the directivity of the receiving antennae 102 is oriented towards arrival angle θ. The signal processing that follows is the same as in a mechanical scanning radar. The reception signals received through the phase shifters 106 are amplified using an amplifier 107, mixed with the transmitter pulses using a mixer 108, and downconverted. These downconverted signals are output and processed in a signal processing unit 109, which outputs information pertaining to distance, speed, and bearing. Thus, in the phased array antenna radar, the phase shifters 106 are used to change the directivity of the antenna even though the receiving antennae 102 remains fixed.

In contrast, the general configuration of a DBF radar resembles the radar apparatus according to the first embodiment as shown in FIG. 1. The radar apparatus according to the first embodiment uses digital signal processing to perform the function of the phase shifters of the phased array antenna radar.

The functioning of the radar apparatus according to the present embodiment is explained next with reference to FIG. 1. The transmitting antenna 11 emits into space, a transmitter pulse that is generated by the oscillator 14 based on a modulating signal from the modulator 15. The receiving antennae 12 receive the signals that reflect off a target object, as reception signals. The amplifiers 16 amplify each of these reception signals, and output the amplified signals to the mixers 17. The mixers 17 downconvert the reception signals output from the amplifiers 16 based on the signals (local signals) fed by the oscillator 14. The filters 18 put bandwidth constraint on the downconverted signals output from the mixers 17. The A/D converters 19 convert the downconverted signals from analog signals into digital signals, and output the digital signals to the signal processing unit 20.

The signal processing unit 20 allows the phase and the amplitude of the signals to be changed as required. Consequently, to achieve any form of antenna directivity, the phases and the amplitudes of the digital signals received by the elements of the receiving antennae can be adjusted based on a predetermined rule, and the signals can be combined. When the signal processing unit carries out antenna directivity by the combining process described earlier, it is called digital beam forming (DBF).

An important feature of DBF is that once the signals received by all the receiving antennae are picked up as digital signals, the beams can be combined to realize directivity of any orientation based on the, digital signals. In other words, multiple beams can be formed from signals picked up in one lot. This feature is used to its fullest extent in the present invention.

Figure 2:
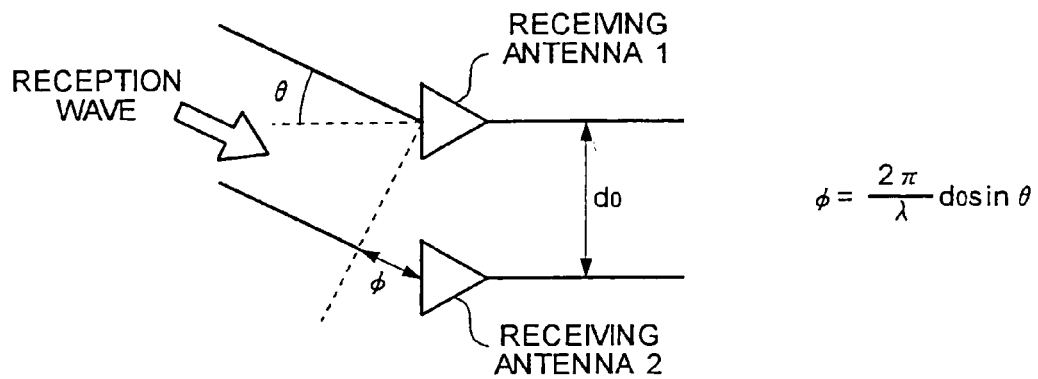
FIG. 2 illustrates a principle of bearing detection using a phase comparison monopulse system.

FIG. 2 illustrates a principle of bearing detection using a phase comparison monopulse system. An incident reception wave makes an angle θ with the normal direction of the antenna surfaces of receiving antennae 1 and 2. A phase difference of $\phi=(2\pi/\lambda) \times d_0 \sin\theta$ occurs between the reception signals of the receiving antennae 1 and 2. Accordingly, in the phase comparison monopulse system, by tracking this phase difference, the arrival angle θ of the radio wave can be tracked based on the expression $\theta=\sin^{-1}(\phi\lambda/2\pi d_0)$.

Figure 3:
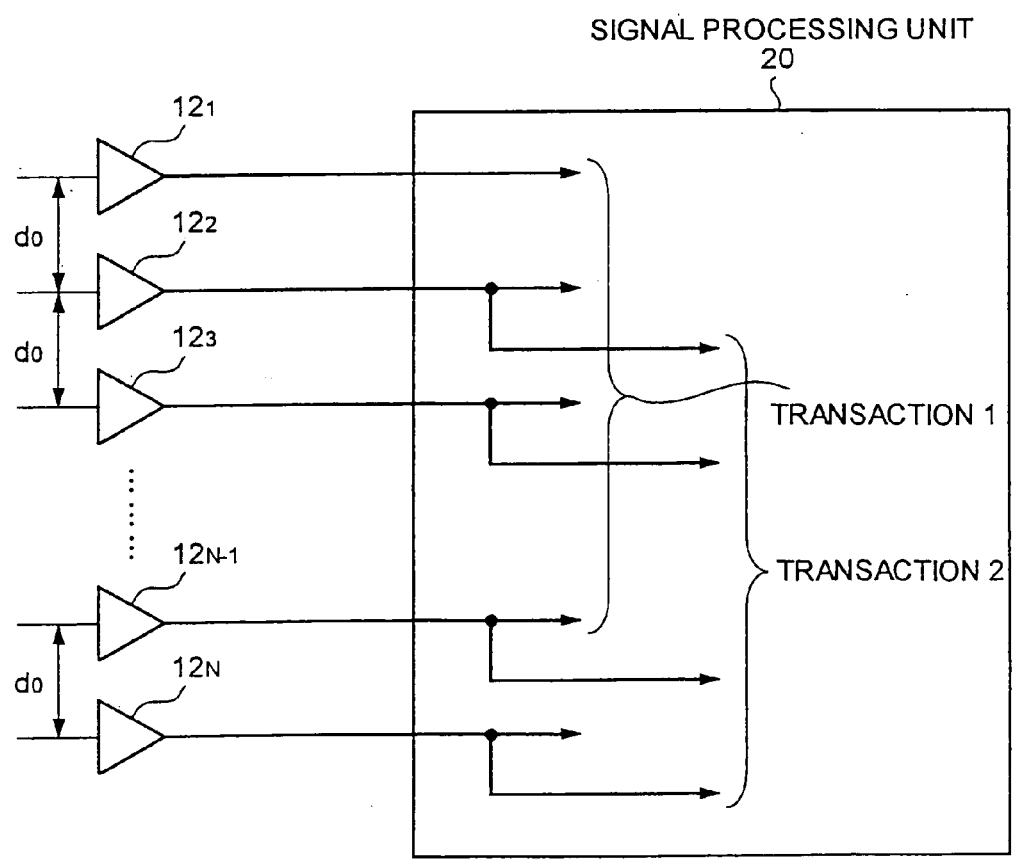
FIG. 3 is a pattern diagram of signal processing according to the first embodiment.

FIG. 3 is a pattern diagram of signal processing according to the first embodiment. The receiving antennae 12 are connected at equal spacing, to the signal processing unit 20, and form a linear array. One each of the amplifiers 16 (not shown), the mixers 17 (not shown), the filters 18 (not shown), and the A/D converters 19 (not shown) are connected to each of the receiving antennae 12.

Signal processing in the signal processing unit 20 shown in FIG. 3 is carried out based on two transactions, namely, transaction 1 and transaction 2. Transaction 1 involves a process of combining the outputs from N−1 number of antenna elements, that is, outputs from the antenna elements $12_1$ through $12_{N-1}$. On the other hand, transaction 2 involves a process of combining the outputs of N−1 number of antenna elements by shifting the antenna elements of transaction 1 downward by one, that is, the output from the antenna elements $12_2$ through $12_N$. Thus, transaction 1 involves a receiving antenna array (sub-array 1) of N−1 elements from $12_1$ through $12_{N-1}$, whereas transaction 2 involves a receiving antenna array (sub-array 2) of N−1 elements from $12_2$ through $12_N$. Transaction 1 and transaction 2 correspond to the receiving antennae 1 and 2, respectively, as shown in FIG. 2.

Figure 4:
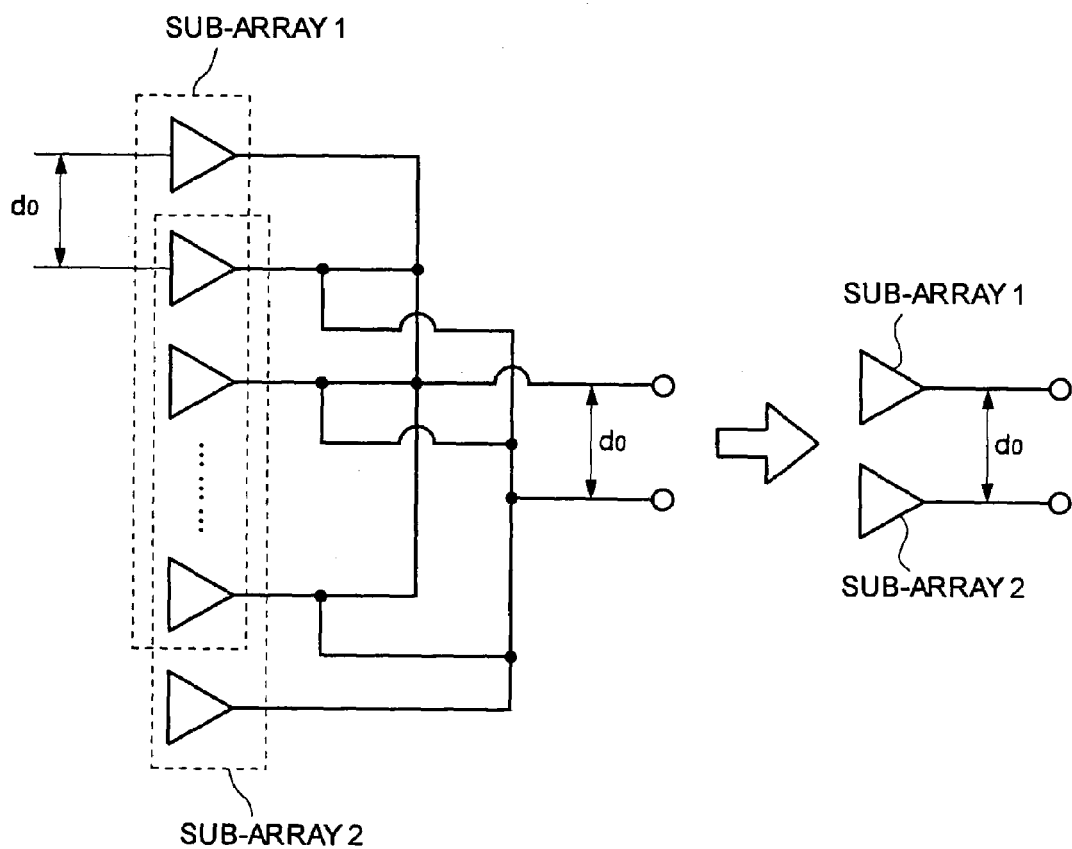
FIG. 4 is a drawing of an equivalent structure obtained by grouping a receiving antenna system shown in FIG. 3 into sub-arrays, each sub-array representing a transaction.

FIG. 4 illustrates an equivalent structure obtained by grouping the receiving antenna system shown in FIG. 3 into sub-arrays, each sub-array representing a transaction. If each sub-array shown in FIG. 3, formed by shifting the antenna elements by one, is considered as one antenna element, then the two sub-arrays can be represented by one antenna element each, as shown in FIG. 4. The spacing between the sub-arrays (sub-array 1 and sub-array 2) is the same as the spacing $d_0$ (minimum spacing) between individual antenna elements.

If the spacing that is set between the sub-array 1 and the sub-array 2 is too large in relation to the wavelength, this causes aliasing of the phase difference between the sub-array 1 and the sub-array 2. Aliasing leads to phase distortion, which compromises the accuracy in detecting the phase difference. This problem is similar to that observed in the beam pattern of a two-element array antenna, in which a sub-array is taken as one element. The problem can be rectified by preventing the occurrence of null in the beam pattern.

Figure 5:
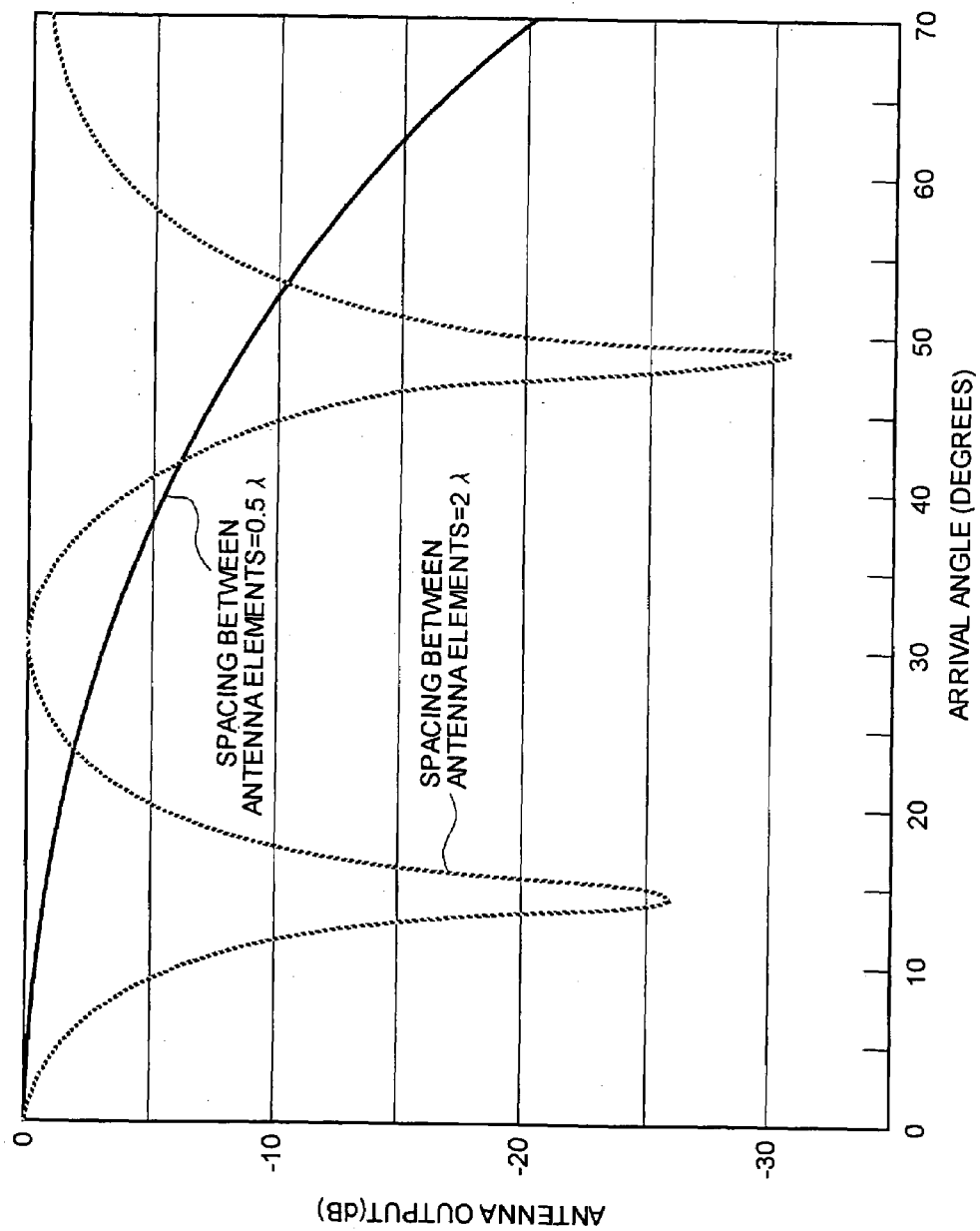
FIG. 5 illustrates an array factor of the two-element array antenna shown in FIG. 4.

FIG. 5 illustrates an array factor of the two-element array antenna shown in FIG. 4. A spacing of 0.5λ (λ indicating the wavelength) between the antenna elements for the arrival angle θ results in a gently sloping beam pattern, whereas a spacing of 2λ shows occurrence of a large null near 15° and 50°. As the spacing between the antenna elements increases, the null moves in the direction of the normal (towards 0°). Thus, it is important to set the spacing as small possible.

However, to implement the sub-array structure as described above in the antenna system, the number of receiving antennae needs to be increased, as in the conventional technology. Moreover, the antennae, which are to be additionally placed, may overlap with a part of existing antennae, thus leading to ineffective arrangement of the antennae. However, the radar apparatus according to the present embodiment implements a sub-array structure using the signal processing unit, without changing the structure of the antenna system. In other words, in the radar apparatus, to implement a structure that corresponds to the sub-array structure described above, the signal processing unit is used to pick up the signals received by the receiving antennae as digital signals, and repeatedly use a part of the digital signals. This sub-array structure increases the reception slot length, thereby enhancing reception gain, which in turn, improves detection performance.

The reception signals once picked up can be used repeatedly and simultaneously. Therefore, several reception beams can be formed simultaneously, thereby preventing the need for the conventional structure where it was required to switch between a plurality of transmitting antennae. Thus, the issue of mounting space constraints can be dealt with in a flexible manner.

The radar apparatus according to the present embodiment repeatedly uses and shares the signals received by the antenna elements forming the sub-array 1 and sub-array 2. Therefore, the process carried out in the signal processing unit can be made efficient by calculating the common arithmetical part beforehand, and repeatedly using the calculation result.

When plural targets are present within the same beam, the reception wave is a combination of radio waves reflected off the plural targets. Therefore, it was felt that separating the multiple targets and accurately detecting their bearing is difficult when monopulse angle measurement is employed. However, in the radar apparatus according to the present embodiment, this drawback can also be overcome, because the phase comparison monopulse process is applied to the DBF type radar apparatus, and a flexible signal processing is possible once the reception signals are picked up. In other words, the drawback described above can be overcome by using the phase comparison monopulse process in combination with a high-resolution process such as Multiple Signal Classification (MUSIC) method, whenever there is a possibility of presence of multiple targets.

Because the amount of computation in the high-resolution processes such as the MUSIC method is large, speedy output of process results is difficult. However, the process based on the MUSIC method need not always be implemented in the radar apparatus according to the present embodiment. This process may be applied only when a high-resolution process is considered necessary. Moreover, because the detection is limited to a predetermined range, the amount of computation is considerably reduced. Therefore, the processing time does not pose a problem. Thus, detection of multiple targets can be effectively carried out.

Thus, the phase comparison monopulse process is carried out using the sub-array 1 and the sub-array 2 as the two receiving antennae. The sub-array 1 includes a specified number of antenna elements. The sub-array 2 includes the same number of antenna elements as the sub-array 1, and begins with the antenna element shifted by a specified shift count from the first antenna element of the antenna element set forming the sub-array 1. Thus, the phase comparison monopulse process that uses the wide range DBF method can be implemented.

The phase comparison monopulse process carried out in the radar apparatus according to the present embodiment has been explained by considering two sub-arrays, sub-array 1 and sub-array 2 as shown in FIG. 4, which carry out the phase comparison monopulse process. However, the structure may be such that alternate antenna elements are combined.

There may be several pairs of sub-arrays carrying out the phase comparison monopulse process. In other words, the number of sub-arrays carrying out the phase comparison monopulse process may be greater than two. For example, these multiple sub-arrays can be used to carry out multiple phase comparison monopulse processes having different detection ranges, thereby making it possible to carry out the separation and the identification of multiple targets based on the results of such multiple phase comparison monopulse processes.

Moreover, the processing technology explained in the present embodiment may be applied to any type of radar apparatus, such as a pulse-Doppler radar apparatus, or a Frequency Modulated Continuous Wave (FM-CW) radar apparatus.

FIG. 7 illustrates a concept of an amplitude comparison monopulse process applied in a DBF radar apparatus according to a second embodiment of the present invention. The structure of the radar apparatus according to the second embodiment is identical to the radar apparatus according to the first embodiment shown FIG. 1. The signal processing unit 20 of the radar apparatus shown in FIG. 1 can easily form beams in such a way that a part of a reception beam 32 of the sub-array 1 overlaps with a reception beam 33 of the sub-array 2, as shown in FIG. 7. Once the beams are formed in this manner, detection process may be carried out according to the steps of the well-known amplitude comparison monopulse process.

Similar to the second embodiment, it is possible to use different types of sub-array structures and different process modes in the present embodiment, and obtain similar results.

FIG. 8 is a block diagram of a radar apparatus according to a third embodiment of the present invention. The radar apparatus shown in FIG. 8 includes a modulation controller 22 between the modulator 15 and the signal processing unit 20. The rest of the structure is identical to the structure according to the first embodiment shown in FIG. 1. The parts in the third embodiment that are the same as or equivalent to the parts in the first embodiment are assigned the same reference numerals.

When fixed objects or medium and long distance target objects are present in the direction of the target object, or when a strong noise source is present even though not in the direction of the target object, the filters 18 may fail to filter out signals from these objects, thereby resulting in detecting a wrong object rather than the intended target. Hence, in the radar apparatus according to the third embodiment, the modulation controller 22 provides control to vary various parameters of the modulated signals output from the modulator 15, based on the control exerted by the signal processing unit 20. For the FM-CW radar apparatus, the parameters of the modulated signals include frequency shift width, repetition cycle, etc. For the pulse-Doppler radar apparatus, the parameters of the modulated signals include pulse repetition frequency, pulse width, etc.

The functioning of the radar apparatus according to the third embodiment is explained next, using the FM-CW radar as an example. The principle of an FM-CW radar is explained first.

In the FM-CW radar apparatus, an oscillator transmits frequency modulated (FM) waves of several hundred hertz in the form of triangular waves, receives signals reflected off the target object, and carries out FM detection of the reception signals by treating the FM waves as local signals. There is a shift in the frequency of the radio waves reflected off the target object relative to the transmitter pulses. The shift in the frequency depends on the distance between the radar and the target object, and a Doppler shift caused by relative speed. Consequently, it is possible to measure the distance from the target object, and the relative speed from the frequency shift. The triangular waves are often used as modulating signals in the FM-CW radar. Although the modulating signals are triangular waves in the description below, they may be sawtooth waves or trapezoid waves.

Figure 9A:
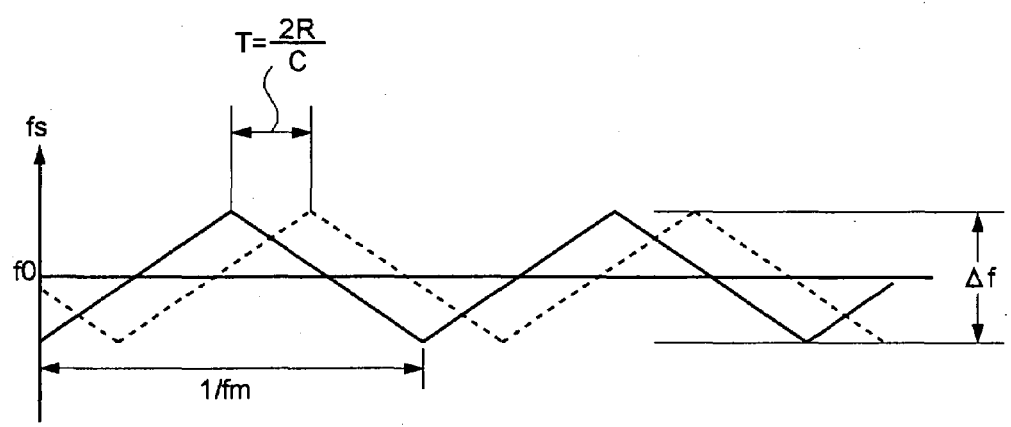
FIG. 9A illustrates a signal waveform of a transmitter pulse and a reception wave in an FM-CW radar when relative speed is 0.
Figure 9B:
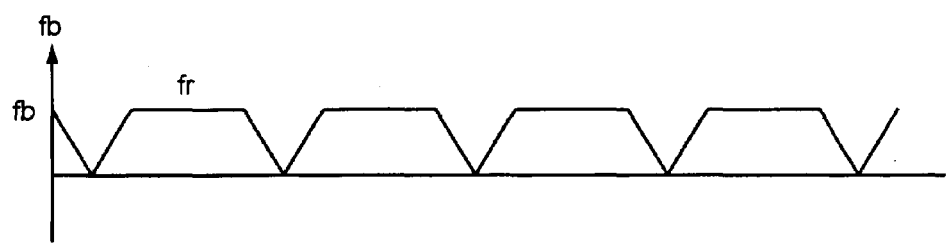
FIG. 9B illustrates a beat frequency of the transmitter pulse and the reception wave in the FM-CW radar when relative speed is 0.

FIG. 9A and FIG. 9B are drawings to explain a principle of the FM-CW radar when the relative speed with respect to the target object is 0. FIG. 9A illustrates a signal waveform of the transmitter pulse and the reception wave, while FIG. 9B illustrates the beat frequency of the transmitter pulse and the reception wave. The transmitter pulse in FIG. 9A is in the form of triangular waves. The solid line indicates the frequency change. $f_0$ is the center frequency of the transmitter pulse, $\Delta f$ is the frequency shift width, and $f_m$ is the pulse repetition frequency. After being reflected off the target object, the transmitter pulse is received by the antennae as the reception wave indicated by the dashed line. If the distance between the target object and the radar apparatus is taken as R, and the propagation speed of the radio wave is C, then the time T taken by the radio wave to arrive back at the radar apparatus after hitting the target object can be calculated by using the formula T=2R/C. The frequency of the reception wave shifts (that is, a beat is produced) relative to the transmitter pulse, based on the distance between the radar and the target-object. A beat frequency component $f_b$ can be calculated by the following expression.

$$f_b = f_r = (4 \times \Delta f \times f_m / C) R \quad (1)$$

Figure 10A:
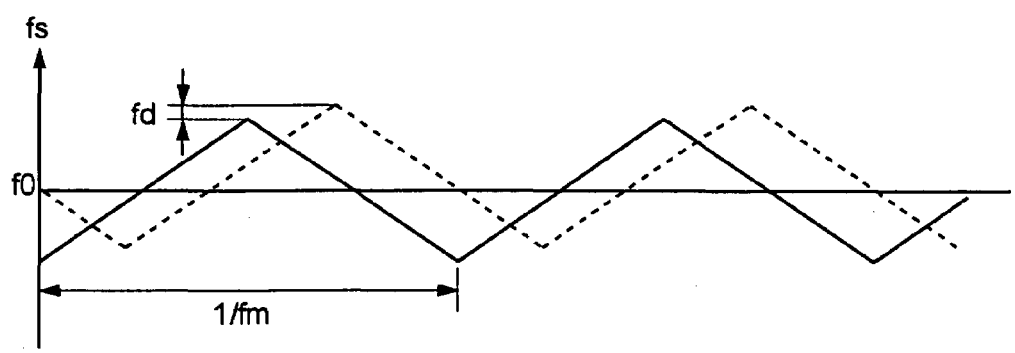
FIG. 10A illustrates a signal waveform of the transmitter pulse and the reception wave in the FM-CW radar when relative speed is v.
Figure 10B:
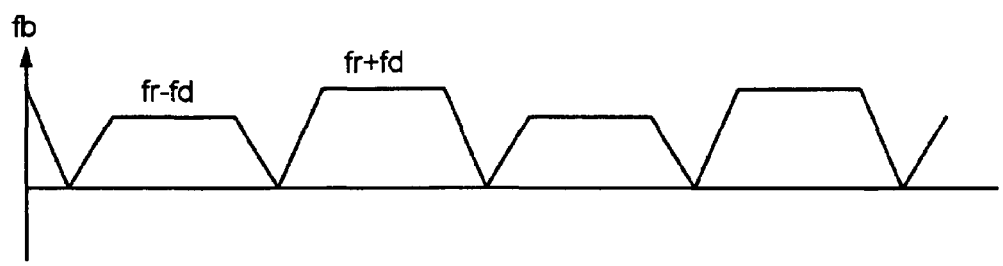
FIG. 10B illustrates a beat frequency of the transmitter pulse and the reception wave in the FM-CW radar when relative speed is v.

FIG. 10A and FIG. 10B are drawings to explain the principle of the FM-CW radar when the relative speed with respect to the target object is v. FIG. 10A illustrates a signal waveform of the transmitter pulse and the reception wave, while FIG. 10B illustrates the beat frequency of the transmitter pulse and the reception wave. The solid line in FIG. 10A indicates the frequency change. After being reflected off the target object, the transmitter pulse is received by the antennae as the reception wave indicated by the dashed line. The frequency of the reception wave shifts (that is, a beat is produced) relative to the transmitter pulse, based on the distance between the radar and the target object. At this time, a Doppler shift occurs in the beat frequency component due to the presence of the relative speed between the radar and the target object, and the beat frequency component $f_b$ changes according to the following expression.

$$f_b = f_r \pm f_d = (4 \times \Delta f \times f_m / C) R + (2 \times f_0 / C) v \quad (2)$$

In expressions (1) and (2), $f_b$ is the transmission and reception beat frequency, $f_r$ is the distance frequency, $f_d$ is the speed frequency, $f_0$ is the center frequency of the transmitter pulse, $\Delta f$ is the frequency shift width, $f_m$ is the repetition frequency of the FM waves, C is the speed of light (speed of radio waves), T is the time taken by the radio wave to return to the radar apparatus after hitting the target object, R is the distance up to the target object, and v is the relative speed with respect to the target object.

The distance, the relative speed, etc., are required because the signal processing unit 20 performs signal processing such as fast Fourier transformation (FFT) of the beat signals indicated in expression (2).

The process of variation control that the modulation controller 22 shown in FIG. 8 exerts over the modulating signals output from the modulator 15 to the oscillator 14 is explained next. FIG. 11A, FIG. 11B, and FIG. 11C are drawings to explain how the modulating signal output from the modulator 15 to the oscillator 14 is controlled.

Variation control of the frequency shift width $\Delta f$ of the modulating signal is explained first. As explained with reference to FIG. 9A and FIG. 9B, when the relative speed with respect to the target object is 0, the frequency of the transmitter pulse received by the antennae after being reflect off the target object shifts (that is, a beat is produced) relative to the transmitter pulse according to the distance between the radar and the target object. This beat frequency component $f_b$ can be calculated by expression (1) mentioned before, which is reproduced below.

$$f_b = f_r = (4 \times \Delta f \times f_m / C) R \quad (1)$$

$\Delta f$ in expression (1) denotes the frequency shift width due to frequency modulation. FIG. 11A illustrates a modulating signal shown as triangular waves with a normal frequency shift width (equivalent to $\Delta f$). FIG. 11B illustrates the modulating signal shown as the triangular waves with a frequency shift width that is twice the standard frequency width of the triangular waves shown in FIG. 11A.

In the radar apparatus shown in FIG. 8, when the modulation controller 22 controls the modulator 15 to change the frequency shift width $\Delta f$ of the modulating signal to n-fold, the value of the beat frequency component $f_b$ becomes n times, as seen from expression (1). The reception signal includes both the beat frequency component $f_b$ and the noise component from the target object. The modulation controller 22 changes $\Delta f$ to n times by controlling the modulator 15. The beat frequency component $f_b$ of the signal from the target object also changes to n times according to the change in $\Delta f$. On the other hand, because there is no change in the frequency component of the noise component, the signal from the target object can be distinguished from the noise component. The distinguishing processes are carried out in the signal processing unit 20.

Variation control of the modulation cycle of the modulating signal is explained next. FIG. 11B is a drawing of the modulating signal having a repetition cycle that is n times the standard repetition cycle of the modulating signal having a standard frequency shift width as shown in FIG. 11A. When the repetition cycle $T_m$ of the modulating signal is changed to n times, the beat frequency component $f_b$ becomes 1/n, as seen from expression (1).

In the radar apparatus shown in FIG. 8, when the modulation controller 22 controls the modulator 15 to change the repetition cycle $T_m$ of the modulating signal to n-fold, the value of the beat frequency component $f_b$ becomes 1/n. When the modulation controller 22 changes the repetition cycle $T_m$ of the triangular waves to n times by controlling the modulator 15, the beat frequency component $f_b$ of the signals from the target object changes to 1/n times, according to the change in the repetition cycle $T_m$. Because there is no change in the frequency component of the noise component, the signals from the target object can be differentiated from the noise component. The signal processing unit 20 carries out the processes involved in the differentiation.

The beat frequency component $f_b$, in the presence of a relative speed v with respect to the target object, can also be calculated by expression (2) mentioned before, which is reproduced below.

$$f_b = f_r \pm f_d = (4 \Delta f \times f_m / C) R + (2 \times f_0 / C) v \quad (2)$$

As is evident from expression (2), even if there is a relative speed between the radar and the target object, it is possible to distinguish the signals from the target object and the noise component by controlling the frequency shift width $\Delta f$ and the repetition cycle $T_m$. Controlling the frequency shift width $\Delta f$ or the repetition cycle $T_m$ is tantamount to controlling the slope of the modulating signal.

It is not necessary to always carry out the control process as in the radar apparatus according to the first embodiment and the second embodiment. The control process may be implemented only when there is a possibility of presence of multiple targets in the detection range. A control process under such a condition helps limit the detection range, reduce the burden of computation, minimize the processing time, and effectively detect multiple targets.

Thus, in the radar apparatus according to the present embodiment, the signal from the target object can be distinguished from other signals by changing the gradient of the modulating signals by varying either the frequency shift width or the repetition cycle or both, and differentiating the signal components that vary, based on the changes in the frequency shift width and the repetition cycle.

In the radar apparatus according to the present embodiment, the process for distinguishing the signal arriving from the target object and other signals is explained by taking an example of the FM-CW radar. However, the process can also be applied to other radars such as the pulse-Doppler radar, etc. In the case of pulse-Doppler radar, pulse repetition frequency, pulse width, etc., of the modulating signal may be controlled.

In the radar apparatus according to the present invention, two sub-arrays, namely, sub-array 1 and sub-array 2, act as receiving antennae that carry out radar process. The sub-array 1 includes a specified number of antenna elements. The sub-array 2 includes the same number of antenna elements as the sub-array 1, and begins with the antenna element shifted by a specified shift count from the first antenna element of the sub-array 1. Hence, using two sub-arrays as two receiving antennae to carry out the radar process enables realization of a wide-range radar using the DBF method.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A radar apparatus comprising:
   a transmitting unit that emits a transmitter pulse, in the form of a radio wave, into space;
   a receiving antenna including a plurality of antenna elements each of which receives, as a reception signal, the radio wave that reaches a target object and is reflected off the target object;
   a receiving unit that receives the reception signal, down-converts the reception signal and puts a bandwidth constraint on the reception signal to obtain an analog signal, converts the analog signal into a digital signal, and outputs the digital signal; and a signal processing unit that detects a bearing of the target object, based on the digital signal, wherein a first transaction includes processing of signals output from a first set of the antenna elements, a second transaction involving processing of the signals output from a second set of the antenna elements, and the signal processing unit executes a specified process based on an output of the first transaction and an output of the second transaction.

2. The radar apparatus according to claim 1, wherein, the specified process is a monopulse process.

3. The radar apparatus according to claim 2, wherein the monopulse process is a phase comparison monopulse process.

4. The radar apparatus according to claim 2, wherein the monopulse process is an amplitude comparison monopulse process.

5. The radar apparatus according to claim 1, wherein the first set of antenna elements includes a specified number of antenna elements, the second set of antenna elements also includes the specified number of antenna elements, and there is a shift-count number of the antenna elements between a first antenna element of the first set and a first antenna element of the second set.

6. The radar apparatus according to claim 5, wherein if the specified number of the antenna elements is N, then the shift-count is one.

7. The radar apparatus according to claim 6, wherein the specified number of antenna elements is N−1.

8. The radar apparatus according to claim 1, wherein there are a plurality of monopulse transaction sets, each of which includes the first transaction and the second transaction.

9. The radar apparatus according to claim 2, wherein the signal processing unit limits a detection range in the monopulse process to a predetermined range.

10. The radar apparatus according to claim 1, wherein the signal processing unit additionally deploys a predetermined high-resolution process, when there is a possibility of plural target objects.

11. The radar apparatus according to claim 10, wherein the predetermined high-resolution process is a Multiple Signal Classification (MUSIC) method.

12. The radar apparatus according to claim 5, wherein the signal processing unit processes in advance, arithmetic processes common to the first transaction and the second transaction.

13. The radar apparatus according to claim 6, wherein the signal processing unit processes in advance, arithmetic processes common to the first transaction and the second transaction.

14. The radar apparatus according to claim 8, wherein the signal processing unit processes in advance, arithmetic processes common to the first transaction and the second transaction.

15. The radar apparatus according to claim 9, wherein the signal processing unit processes in advance, arithmetic processes common to the first transaction and the second transaction.

16. The radar apparatus according to claim 10, wherein the signal processing unit processes in advance, arithmetic processes common to the first transaction and the second transaction.

17. The radar apparatus according to claim 1, wherein a modulating signal modulates the transmitter pulse, and the transmitting unit further includes a modulation control unit that provides control to vary a predetermined parameter of the modulating signal, based on a control provided by the signal processing unit.

18. The radar apparatus according to claim 1, wherein the transmitter pulse is a frequency modulated continuous wave (FM-CW) signal.

19. The radar apparatus according to claim 17, wherein the predetermined parameter of the modulating signal is at least one of a frequency shift and a repetition cycle.

* * * * *